United States Patent
Dhanapal et al.

(10) Patent No.: US 9,749,397 B2
(45) Date of Patent: Aug. 29, 2017

(54) METHODS, SYSTEMS, AND COMPUTER-READABLE MEDIA FOR TESTING APPLICATIONS ON A HANDHELD DEVICE

(71) Applicant: Infosys Limited, Bangalore (IN)

(72) Inventors: Karthikeyan Balaji Dhanapal, Bangalore (IN); Arun Agrahara Somasundara, Karnataka (IN); Harikrishna Gandhinagara Narayana Rai, Bangalore (IN); Krishnamurty Sai Deepak, Bangalore (IN)

(73) Assignee: Infosys Limited, Bangalore (IN)

( * ) Notice: Subject to any disclaimer, the term of this patent is extended or adjusted under 35 U.S.C. 154(b) by 53 days.

(21) Appl. No.: 14/490,563

(22) Filed: Sep. 18, 2014

(65) Prior Publication Data

US 2015/0089298 A1 Mar. 26, 2015

(30) Foreign Application Priority Data

Sep. 20, 2013 (IN) .......................... 4258/CHE/2013

(51) Int. Cl.
*G06F 11/00* (2006.01)
*H04L 29/08* (2006.01)
*G06F 11/36* (2006.01)

(52) U.S. Cl.
CPC .......... *H04L 67/10* (2013.01); *G06F 11/3664* (2013.01); *H04L 67/04* (2013.01)

(58) Field of Classification Search
CPC .. G06F 11/3664; G06F 11/3688; H04L 67/04; H04L 67/10

(Continued)

(56) References Cited

U.S. PATENT DOCUMENTS 6,697,969 B1* 2/2004 Merriam ............ G06F 11/0709
 709/224
6,857,013 B2* 2/2005 Ramberg ............ G06F 11/0709
 709/220

(Continued)

OTHER PUBLICATIONS

Lee, "Design and Implementation of a Linux Phone Emulator supporting automated application testing," Third 2008 International Conference on Convergence and Hybrid Information Technology, Jul. 2008, 4 pages.

(Continued)

*Primary Examiner* — Yair Leibovich
(74) *Attorney, Agent, or Firm* — Klarquist Sparkman, LLP (57) ABSTRACT

Techniques for testing one or more applications running on a handheld device include: receiving, by a tester system, an error state corresponding to the one or more applications; retrieving, by the tester system, one or more tests script parameters corresponding to the error state from a database, wherein the one or more test script parameters corresponding to the error state are stored in the database; providing, by the tester system, the one or more test script parameters to an input subsystem, wherein the input subsystem is connected to the handheld device; notifying a user to provide one or more inputs corresponding to the error state, wherein the one or more test script parameters are not stored in the database; receiving, by the tester system, the one or more inputs from the user; and providing, by the tester system, the one or more inputs to the input subsystem.

23 Claims, 6 Drawing Sheets

(58) Field of Classification Search
USPC .................................................. 714/46, 38.1
See application file for complete search history.

(56) References Cited

U.S. PATENT DOCUMENTS

| | | | |
|---|---|---|---|
| 2004/0064225 A1* | 4/2004 | Jammu | G06Q 10/06 701/29.4 |
| 2004/0153823 A1* | 8/2004 | Ansari | G06F 11/0715 714/38.14 |
| 2004/0216044 A1* | 10/2004 | Martin | G06F 8/10 715/273 |
| 2006/0174162 A1 | 8/2006 | Varadarajan et al. | |
| 2008/0177994 A1* | 7/2008 | Mayer | G06F 9/4418 713/2 |
| 2011/0028145 A1 | 2/2011 | Marsyla et al. | |
| 2013/0050118 A1* | 2/2013 | Kjelsbak | G06F 3/04883 345/173 |

OTHER PUBLICATIONS

Mobile Application Testing at SPEC INDIA, http://www.spec-india.com/mobile-application-testing-at-spec-india.htm, archived Nov. 2011, 1 page.

* cited by examiner

METHODS, SYSTEMS, AND COMPUTER-READABLE MEDIA FOR TESTING APPLICATIONS ON A HANDHELD DEVICE

TECHNICAL FIELD

The field relates to application testing, and particularly to application testing on a handheld device.

BACKGROUND

The consumer market for mobile phone applications is increasing at enormous pace. The applications require extensive testing to discover and eliminate hidden flaws and bugs. Conventionally, application testing involves loading an application on a mobile phone and operating it with the help of a human tester. The human tester performs various operations, and compares the output with the expected output as per the test case. This method requires the human tester to be present in the mobile phone network, restricting the direct application of the global outsourcing business model for functional testing of mobile phones.

Currently, mobile application testing solutions offer the provision of remote automatic mobile testing. In such testing solutions handsets can be accessed remotely over the Internet with an hourly subscription fee. The subscriber receives a handset GUI on his tester system (e.g. a computing device) that allows operation similar to a real device in hand. The operating instructions are sent to the real device and output is communicated to the GUI on the tester's computer. The video camera captures the screen output of handset and communicates it to a remote tester. Moreover, existing commercial solutions rely on giving absolute co-ordinates for scripting. For example, to specify the login/password field in a user authentication environment, the script creator needs to specify the (x,y) co-ordinates of the dialog box where the inputs need to be provided. In addition, different handheld devices may have different scripts for inputting login/password fields depending on the requirement.

Existing automated mobile application testing solutions do not have adaptive capability to learn from the past experience and improve its performance in the future. The current technology of mobile testing has primarily been driven by inputs from a human tester. A human tester needs to provide regular inputs through a user interface for a test case of the application. Further, in case of semi-automated systems, regular inputs are required from a human tester with no provision for the testing device to learn and adapt itself for the test case.

Therefore, there is a need for enhancing the automation in mobile application testing systems such that the testing systems are adaptive to learn through user inputs and correct itself when the same test case is repeated next time.

SUMMARY

The present disclosure in one embodiment describes a method for testing one or more applications running on a handheld device. The method involves receiving, by a tester system, an error state corresponding to the one or more applications. The method further involves retrieving, by the tester system, one or more test script parameters corresponding to the error state from a database, wherein the one or more test script parameters corresponding to the error state are stored in the database. In addition, the method includes providing the one or more test script parameters to an input subsystem, such that the input subsystem is connected to the handheld device. Further, the method includes notifying a user to provide one or more inputs corresponding to the error state, wherein the one or more test script parameters are not stored in the database. Additionally, the method involves receiving the one or more inputs from the user and providing the one or more inputs to the input subsystem.

Another embodiment of the present disclosure provides a tester system for testing one or more applications that are being processed on a handheld device. The tester system includes a processor and a memory operatively coupled to the processor. The processor executes the method of receiving an error state corresponding to the one or more applications, retrieving one or more test script parameters corresponding to the error state from a database, wherein the one or more test script parameters corresponding to the error state are stored in the database, providing the one or more test script parameters to an input subsystem, such that the input subsystem is connected to the handheld device, notifying a user to provide one or more inputs corresponding to the error state, wherein the one or more test script parameters are not stored in the database, receiving the one or more inputs from the user and providing the one or more inputs to the input subsystem.

Yet another embodiment of the present disclosure provides a system for testing one or more applications. The system includes an input subsystem and an output subsystem. The system further includes a tester system which includes a processor and a memory operatively coupled to the processor. The processor executes the method of receiving an error state corresponding to the one or more applications from the output subsystem, wherein the output subsystem is configured to capture a screen image of the error state from the handheld device and transmits the screen image of the error state to the tester system, retrieving one or more test script parameters corresponding to the error state from a database, wherein the one or more test script parameters corresponding to the error state are stored in the database and providing the one or more test script parameters to the input subsystem. The input subsystem comprises a subsystem receiver configured to receive the one or more test script parameters and the one or more user inputs from the tester system and a processing module configured to process the one or more test script parameters and the one or more user inputs on the handheld device. The processor further executes the method of notifying a user to provide one or more inputs corresponding to the error state, wherein the one or more test script parameters are not stored in the database, receiving the one or more inputs from the user and providing the one or more inputs to the input subsystem.

Still another embodiment of the present disclosure provides a computer-readable storage medium storing instructions for testing one or more applications running on a handheld device using one or more computing devices. The method involves receiving, by a tester system, an error state corresponding to the one or more applications. The method further involves retrieving, by the tester system, one or more test script parameters corresponding to the error state from a database, wherein the one or more test script parameters corresponding to the error state are stored in the database. In addition, the method includes providing the one or more test script parameters to an input subsystem, such that the input subsystem is connected to the handheld device. Further, the method includes notifying a user to provide one or more inputs corresponding to the error state, wherein the one or more test script parameters are not stored in the database.

Additionally, the method involves receiving the one or more inputs from the user and providing the one or more inputs to the input subsystem.

While systems and methods are described herein by way of example and embodiments, those skilled in the art recognize that systems and methods for electronic financial transfers are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

The following detailed description is made with reference to the figures. Preferred embodiments are described to illustrate the disclosure, not to limit its scope, which is defined by the claims. Those of ordinary skill in the art will recognize a number of equivalent variations in the description that follows.

Figure 1:
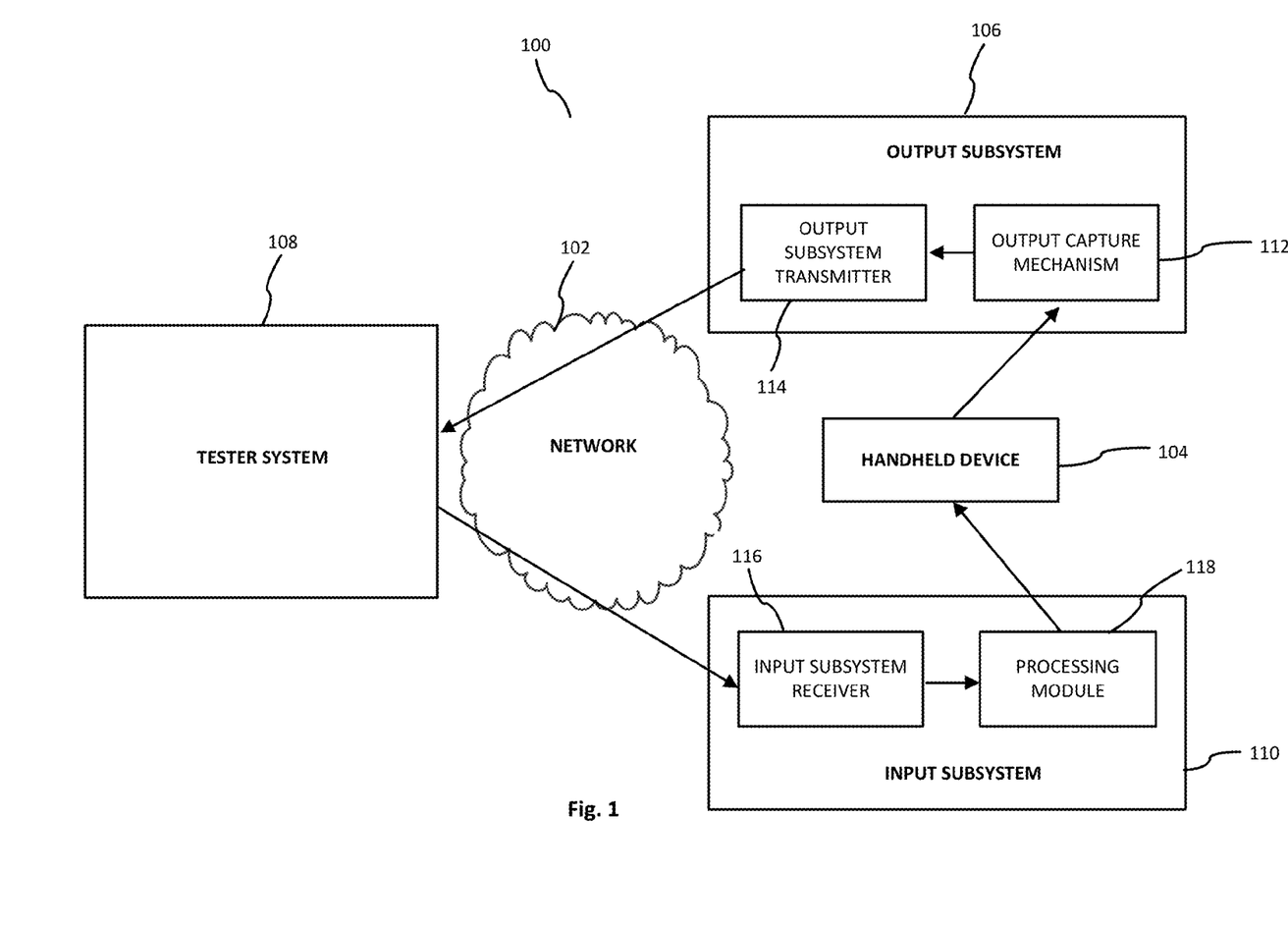
FIG. 1 schematically illustrates an exemplary system for testing one or more applications that are being processed on a handheld device.

FIG. 1 schematically illustrates a system 100 for testing one or more applications that are being processed on a handheld device. The system 100 includes a network 102, a handheld device 104, an output subsystem 106, a tester system 108, and an input subsystem 110. The handheld device 104 refers to an electronic device which is capable to communicate via network 102 such as a mobile phone, a Smartphone, a Personal Digital Assistant (PDA), a laptop and a handheld game console.

As shown in FIG. 1, the handheld device 104, the output subsystem 106, the tester system 108, and the input subsystem 110 are linked to the network 102. Network 102 may be a wireless network or a wired network or a combination thereof. Exemplary wireless connection network 102 includes an over-the-air interface, like Internet, Wi-Fi, Wireless Local Area Network (WLAN), cellular network, etc., for transmitting and receiving data. Such wireless connection may include wireless gateways, routers, switches, hubs, or cellular base stations. Exemplary wired connection network 102 includes a local area network (LAN) connection, a metropolitan area network (MAN), a wide area network (WAN), or a traditional telephone interface. Additionally, the network can be a local, regional, or global communication network such as an enterprise Intranet, Internet, or any combination of similar systems. For example, the network may be an interconnection between an enterprise network, Internet, and a cellular network. When the network is a combination of an enterprise network (or the Internet), and a cellular network, suitable means are employed to seamlessly communicate between the two networks. For instance, a mobile switching gateway may communicate with a computer network gateway to pass data between the two networks. Similarly, if the network 102 includes two or more networks employing differing protocols, suitable interfaces may be introduced to allow communication between these disparate networks.

The output subsystem 106 includes an output capture mechanism 112 and an output subsystem transmitter 114. The output capture mechanism 112 may be an imaging device that captures an image of the screen of handheld device 104 at predetermined intervals and sends the captured image to the output subsystem transmitter 114. The imaging device can be a camera, a webcam, an SLR, or any other device which is capable of capturing images. The output subsystem transmitter 114, then, transmits the captured image of the screen of handheld device 114 to the tester system 108.

The tester system 108 is connected to input subsystem 110 and output subsystem 106 through the network 102. The tester system 108 has one or more processing devices designed to process instructions, for example, computer readable instructions (i.e., code) stored on a storage device. The storage device may be any type of storage device (e.g., an optical storage device, a magnetic storage device, a solid state storage device, etc.), for example a non-transitory storage device. Alternatively, instructions may be stored in one or more remote storage devices, for example storage devices accessed over a network or the Internet. By processing instructions, the processing device may perform the steps and functions disclosed herein. The processing device receives screen images of handheld device 104 from output subsystem 106 at predetermined intervals. The processing device may choose to store the received screen images in the storage device or may delete it. The received screen images are displayed on a display of the tester system 108 by the processing device. The test script parameters corresponding to the received screen images are retrieved from storage device by the processing device and transmitted to the input subsystem 110. In case an error occurs in running the application script successfully on the handheld device 104, the processing device notifies a user to provide user inputs. A successful test script execution is meant to provide desired output corresponding to the given input. The user described herein is a human tester located at or near to tester system 108 and can provide user inputs through a user interface of the tester system 108. The user inputs are then stored in the storage device of the tester system 108 by the processing device.

In alternative embodiments, the tester system 108 may be coupled to one or more devices to perform one or more steps or functions as performed by the processing device. For example, the tester system 108 may be coupled to a notifying device to notify the user in case an error occurs in successful running of the application script. The notifying device, in such a case, may provide alerts in different forms such as window pop-up, a sound alarm, a light flash or through any other means. Further, the storage device can also be a separate device coupled to the tester system 108.

The input subsystem 110 includes an input subsystem receiver 116 and a processing module 118. The input subsystem receiver 116 is configured to receive the test script parameters and/or the user inputs from the tester system 108, which are then transferred to processing module 118. The processing module 118 is configured to process the test script parameters and the user inputs on the handheld device 104. In one embodiment, the processing module 118 may employ a 3-axis robot which can move in a 2-D plane and perform various operations like pressing, holding, scrolling, etc., on the handheld device 104 corresponding to the test script parameters and/or the user inputs.

Figure 2:
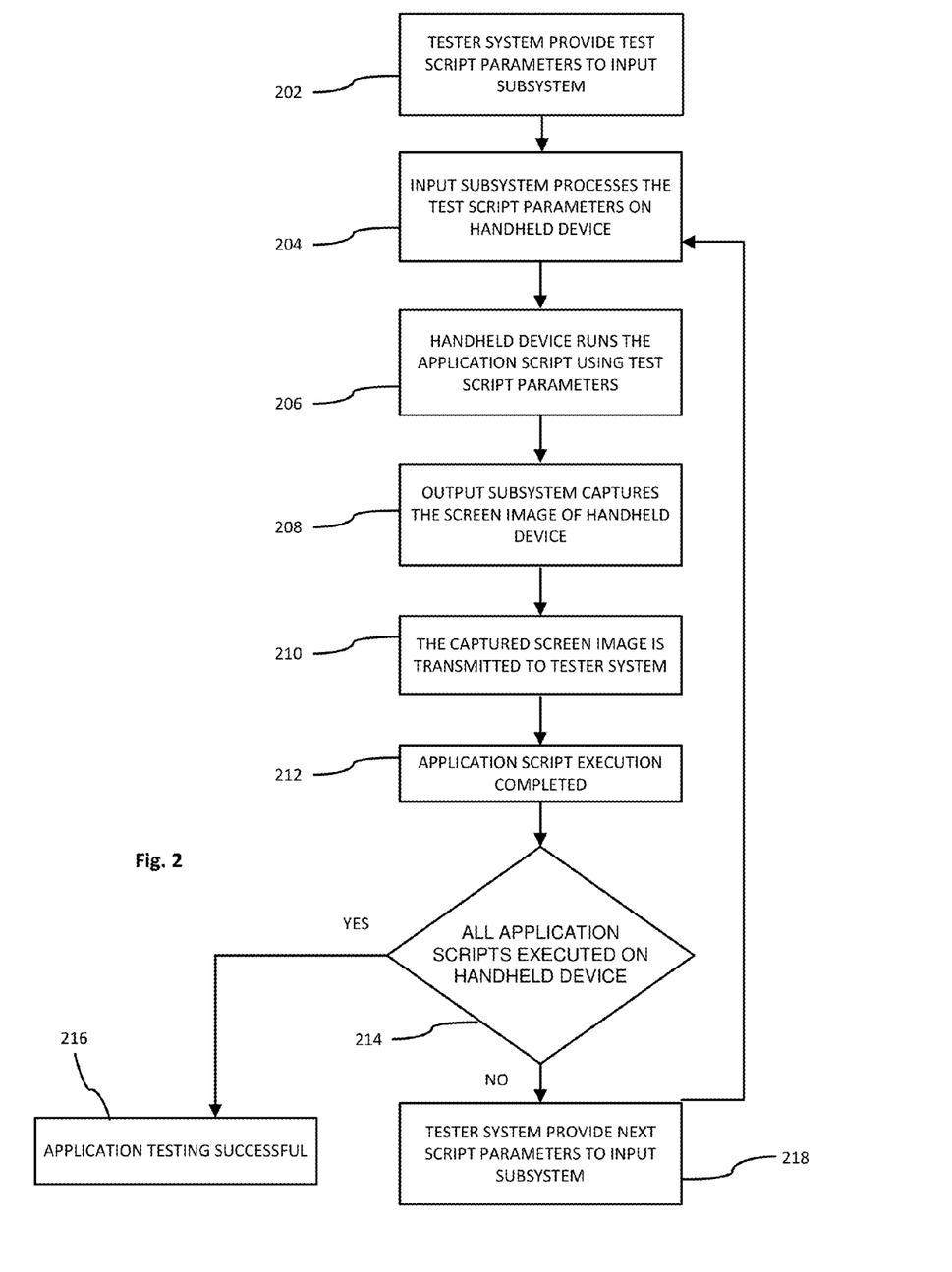
FIG. 2 is a flowchart depicting an error-free case during testing one or more applications running on the handheld device.

FIG. 2 is a flowchart illustrating an error-free instance during testing of one or more applications running on the handheld device 104. At step 202, the tester system 108 provides test script parameters to input subsystem 110. The test script parameters are a set of executable instructions to perform various test operations on the handheld device 104. The test script parameters are received by the input subsystem receiver 116 and transferred to the processing module 118. At step 204, the processing module 118 processes the test script parameters on the handheld device 104. In the exemplary embodiment of FIG. 2, the processing module 118 employs a 3-axis robot which can move in a 2-D plane and can perform various functions on handheld device 104. The 3-axis robot can perform the functionalities of pressing, multi-pressing, holding and scrolling on the handheld device 104. The test script parameters received from the input subsystem receiver 116 are converted into mechanical actions of the 3-axis robot by the processing module 118. The mechanical actions are then used for providing inputs in form of pressing, multi-pressing, holding and scrolling on the handheld device 104 to run the application script. On receiving the inputs from input subsystem 110, the handheld device 104, at step 206, runs the application script. The application script is a set of executable instructions to perform various test operations on the handheld device 104.

In step 208 of FIG. 2, the screen image of the handheld device 104 is captured by the output capture mechanism 112 of output subsystem 106. In the exemplary embodiment of FIG. 2, the output capture mechanism 112 may be a camera installed over the handheld device 104 to capture the screen of the handheld device 104 at predetermined intervals. The predetermined intervals can be a default setting of the output capturing mechanism 112 or can be manually set by a human operator. In step 210, the screen image captured by output capturing mechanism 112 is transferred to the tester system 108 by output subsystem transmitter 114. The tester system 108 can store the captured screen images in a database. Further, the tester system 108 can chose to store some or all of the captured images received from the output subsystem transmitter 114 depending upon the requirement.

In an alternative embodiment, the handheld device 104 may have in-built capability to capture the screen images of its screen at predetermined intervals. In such a scenario, the captured screen images are directly transmitted to the tester system 108 without requiring the output subsystem 106.

At step 212, the application script execution is completed on handheld device 104 without encountering an error and providing the desired output corresponding to the given inputs. Step 214 involves determination of execution status of all the application scripts on the handheld device 104. On determining that all application scripts execution has been completed on the handheld device 104, application testing status is notified as successful at step 216. The notification can be provided to the tester system 108 in form of a window pop-up, a sound alarm, a light flash or through any other suitable means. In case all the application scripts have not been executed on the handheld device 104, the tester system 108 provides next test script parameters to the input subsystem 110 at step 218. The process, then, goes back to step 204 to repeat the steps till all the application scripts are executed on the handheld device 104.

Figure 3A:
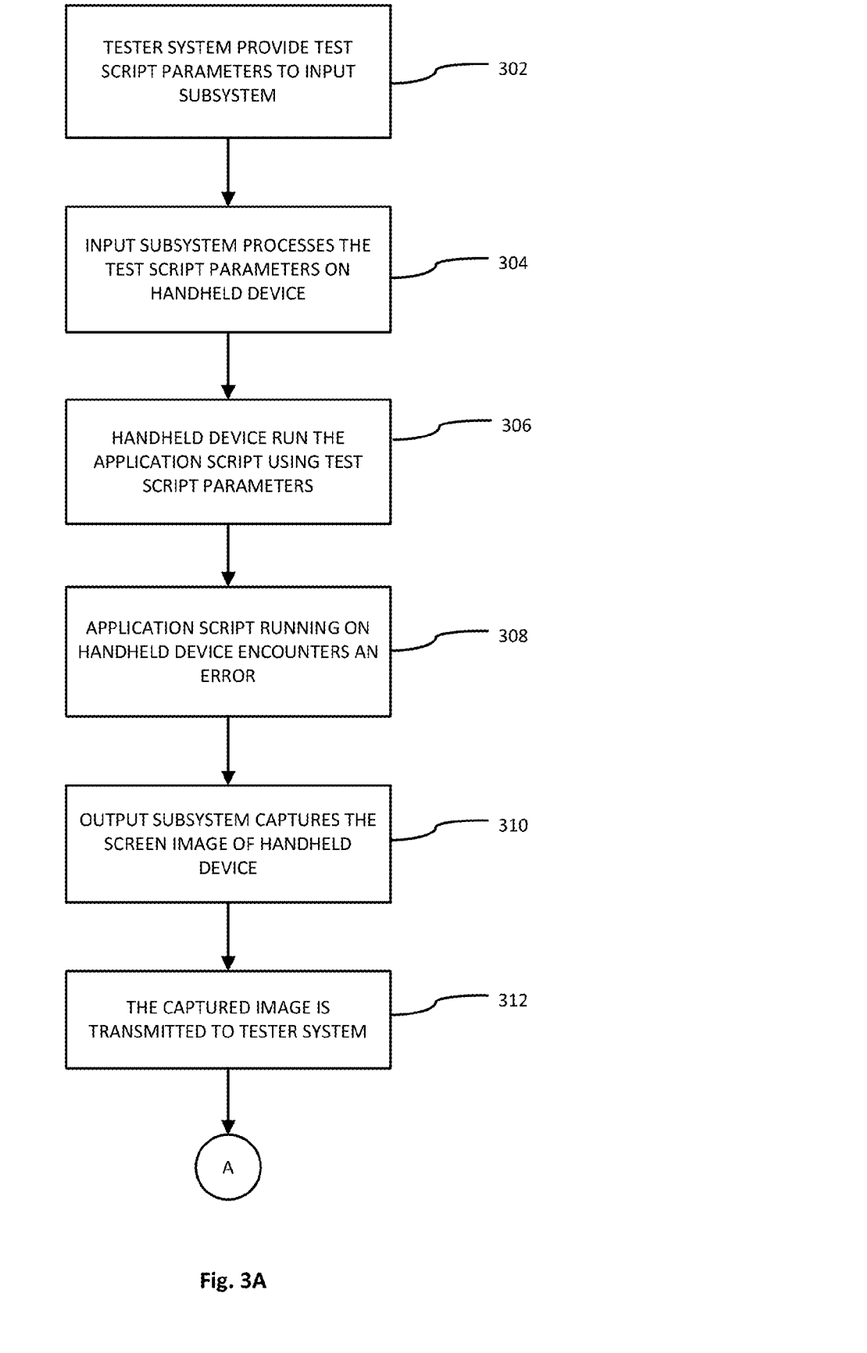
FIGS. 3A and 3B are a flowchart depicting an erroneous case identified during testing one or more applications running on the handheld device.

FIG. 3A is a flowchart depicting an erroneous case identified during testing of one or more applications running on the handheld device 104. At step 302, the tester system 108 provides test script parameters to input subsystem 110. At step 304, the input subsystem 110 processes the test script parameters on the handheld device 104. The handheld device 104 runs the application script using the test script parameters in step 306. An error state is identified at step 308 in running the application script. The error state may either cause the handheld device 104 to stop running the application script or may put the handheld device 104 in an unknown state. The error state in running the application script on handheld device 104 can occur due to variety of reasons. The error state may occur due to the application script which is erroneous to complete execution on the handheld device 104. Alternately, the test script parameters provided by the tester system 108 may not be correct to successfully execute the application script on handheld device 104 and provide the desired output. For example, the application script requires the input subsystem 110 to identify an icon on the handheld device 104 and press it. In such a scenario, the test script parameters are provided by the tester system 108 on the screen image of the handheld device 104 received from the output subsystem 106. In a particular case the image processing technique employed at the tester system 108 is not able to identify a particular text or object on the screen image of the handheld device 104 specified in the application script. Alternately, the screen image of the handheld device 104 contains multiple instance of a text or object specified in the application script. In such cases, the tester system 108 may not be able to provide test script parameters or may provide incorrect test script parameters on the screen image of the handheld device 104. As a result, the application script can either stop executing on the handheld device 104 or may put the handheld device 104 in an unknown state (like non-ending loop). At step 310, the output subsystem 106 captures the screen image of the handheld device 104 and transmits it to the tester system 108 in step 312. The screen image of the handheld device 104 shows the error state corresponding to the error encountered while running the application script. The error state can be in form of a window pop-up showing error on the screen of the handheld device 104, application script execution stopped without completion or through any other suitable form.

Figure 4:
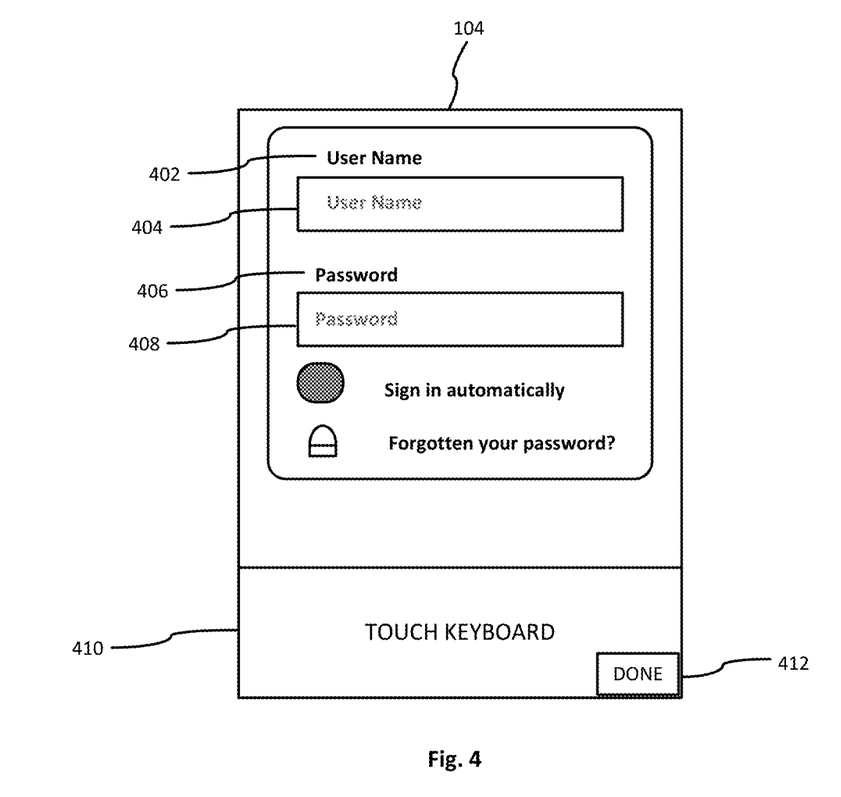
FIG. 4 is an exemplary screen image of the handheld device.

FIG. 4 shows an exemplary screen image of the handheld device 104. The screen image is captured by the output subsystem 106 and sent to the tester system 108. The screen image shows a GUI for authentication by inputting a user name and a password. The screen image shows multiple instances of the user name and password. User name 402 is the field name and user name 404 is within the box for providing inputs. Similarly, password 406 is the field name and password 408 is within the box for providing inputs. In such a case, the tester system 108 can become indecisive to automatically enter user name and password at the correct place. The tester system 108 can either do not provide any input or can select wrong fields for inputting user name and password.

Of course, the application script running on the handheld device 104 can encounter error state in a variety of different ways. The embodiments are not limited by the exemplary error conditions defined above.

Figure 3B:
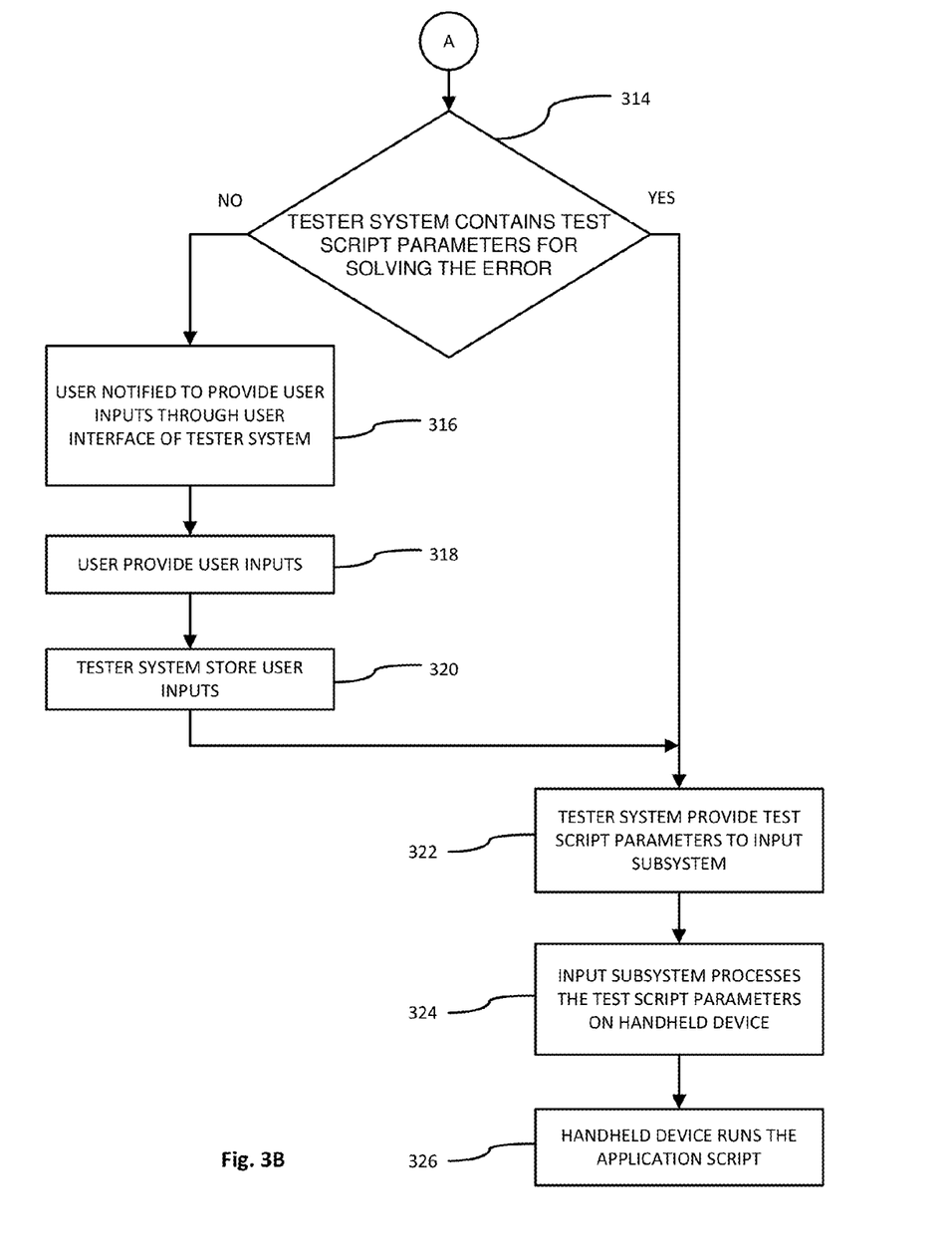

In FIG. 3B, step 314 involves determining if tester system 108 contains the test script parameters for solving the error occurred while running the application script. In case the tester system 108 contains the test script parameters, it automatically retrieves the test script parameters and provides it to the input subsystem 110 at step 322. At step 324, test script parameters are processed on the handheld device 104 by the processing module 118 to run the application script on the handheld device 104 at step 326.

At step 314, if it is determined by the tester system 108 that it does not contain the test script parameters for solving the error occurred in running the application script, the user at the tester system 108 is notified to provide user inputs through the user interface of the tester system 108 at step 316. The notification to user can be provided in various forms of window pop-up on the display of the tester system 108, a sound alarm generated by the tester system 108 or a light flash on the tester system 108 or through any other suitable means. Alternately, a separate notification system may be connected to the tester system 108 for providing notification to the user. The notification methods described above are exemplary ways and should not limit the scope of the embodiments.

At step 318, the user provide the user inputs for resolving the error occurred while running the application script on the handheld device 104. The user is displayed the screen image of the handheld device 104 on the display of the tester system 108. The user, then, provide user inputs on the screen image to resolve the error and run the application script. The user inputs can be provided in form of a text or an image object selection on the screen image, inputs through key strokes, mouse hovering or touch gestures on the screen image or indicating right instances of the text or image object on the screen image. For example, the user may point to the location of text or the image object on the screen image which needs to be selected or the place where user inputs needs to be provided. With reference to FIG. 4 which contains multiple instances of the user name and password, the user can point to the boxes 404 and 408 where user name and password need to be provided, respectively. Alternately, the user can create application script. The tester system 108 can help the user in creating test script by extracting all the text and image objects from its storage device and present it to the user on the display. The user can choose the valid fields and image objects and can give the corresponding test values for each of the chosen fields. The user input methods described above are exemplary ways and should not limit the scope of the embodiments.

At step 320, the user inputs are stored in the storage device of tester system 108. In case the application script encounters similar error state again, the stored user inputs are automatically retrieved from the storage device of the tester system 108 and provided to the input subsystem 110 to successfully run the application script with the desired output on the handheld device 104. The user, then, will not be notified to provide user inputs again to resolve the error. The user inputs on the screen image can be stored in the storage device in a variety of ways. For example, tester system 108 can store the absolute location of the text or image object pointed by the user in the screen image of the handheld device 104. It can also store the location of the text or image object relative to the location of other objects in the screen image. Alternately, the tester system 108 can extract the image characteristics of a portion pointed out by the user in the screen image and store it for later use. Of course, the storage methods for user inputs in the storage device described above are exemplary ways and should not limit the scope of the embodiments.

Figure 5:
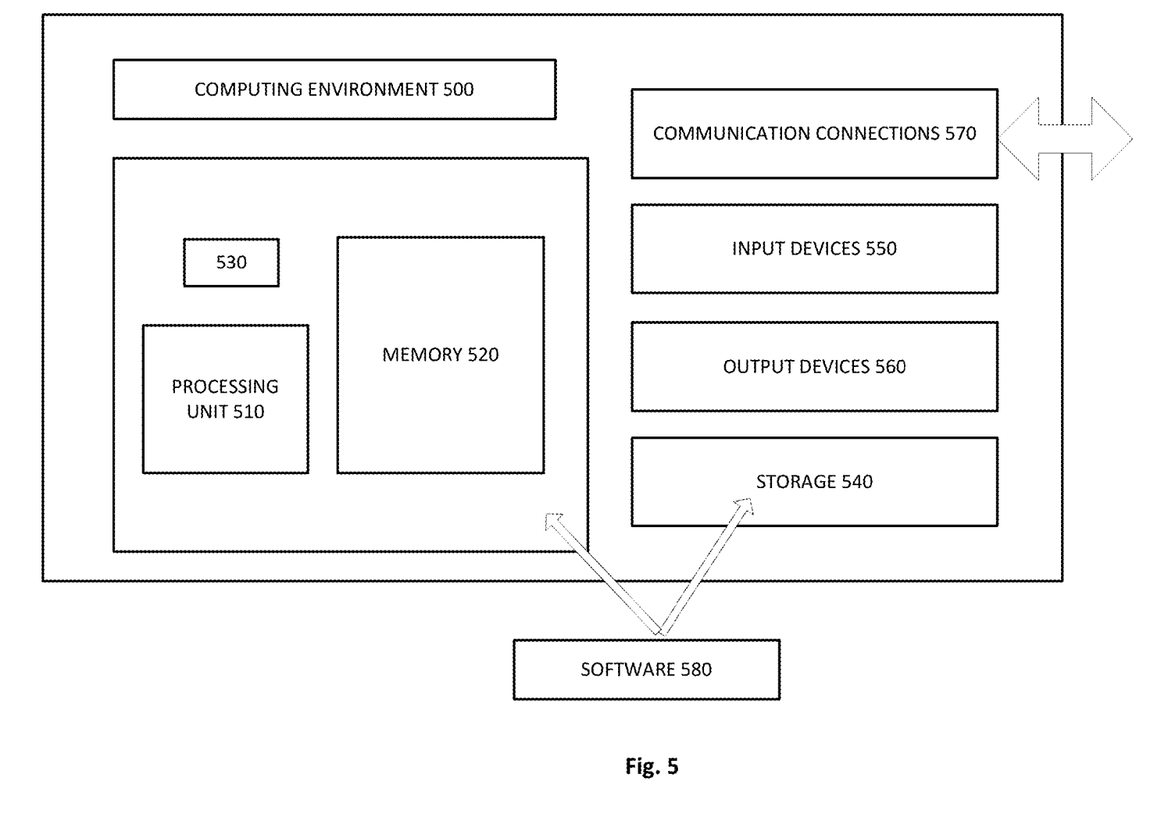
FIG. 5 shows an exemplary computing environment useful for performing processes disclosed herein.

One or more of the above-described techniques may be implemented in or involve one or more computer systems. FIG. 5 illustrates a generalized example of a computing environment 500. The computing environment 500 is not intended to suggest any limitation as to scope of use or functionality of described embodiments.

With reference to FIG. 5, the computing environment 500 includes at least one processing unit 510 and memory 520. In FIG. 5, this most basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. In some embodiments, the memory 520 stores software 580 implementing described techniques.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which may be used to store information and which may be accessed within the computing environment 500. In some embodiments, the storage 540 stores instructions for the software 580.

The input device(s) 550 may be a touch input device such as a keyboard, mouse, pen, trackball, touch screen, or game controller, a voice input device, a scanning device, a digital camera, or another device that provides input to the computing environment 500. The output device(s) 560 may be a display, printer, speaker, or another device that provides output from the computing environment 500.

The communication connection(s) 570 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 500, computer-readable media include memory 520, storage 540, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

Embodiments have been disclosed herein. However, various modifications can be made without departing from the scope of the embodiments as defined by the appended claims and legal equivalents.

What is claimed is:

1. A method of testing one or more applications running on a handheld device, the method comprising:
    receiving, by a tester system, a first error state corresponding to a first error encountered while running the one or more applications;
    making a determination, by the tester system, whether the tester system contains one or more test script parameters for solving the first error;
    after determining that the tester system contains one or more test script parameters for solving the first error, retrieving, by the tester system, the one or more test script parameters for solving the first error;
    providing, by the tester system, the one or more test script parameters for solving the first error to an input subsystem, wherein the input subsystem is connected to the handheld device;
    receiving, by the tester system, a second error state corresponding to a second error encountered while running the one or more applications;
    making a determination, by the tester system, whether the tester system contains one or more test script parameters for solving the second error;
    after determining that the tester system does not contain one or more test script parameters for solving the second error, notifying, by the tester system, a user to provide one or more user inputs for solving the second error;
    receiving, by the tester system, the one or more user inputs for solving the second error from the user;
    providing, by the tester system, the one or more user inputs for solving the second error to the input subsystem;
    storing, within the tester system, the one or more user inputs for solving the second error;
    upon subsequent receipt, by the tester system, of the second error again, retrieving, by the tester system, the one or more stored user inputs for solving the second error; and
    providing, by the tester system, the one or more stored user inputs for solving the second error to the input subsystem, thereby avoiding notifying the user again to resolve the second error.

2. The method of claim 1, wherein the second error state is received by the tester system through an output subsystem, wherein the output subsystem captures a screen image of the second error state from the handheld device.

3. The method of claim 2, wherein the output subsystem further captures the screen image from the handheld device at one or more predetermined intervals.

4. The method of claim 1, wherein the second error state is displayed on a display unit.

5. The method of claim 1, wherein the one or more user inputs from the user are stored in a database.

6. The method of claim 1, wherein the input subsystem processes the one or more test script parameters and the one or more user inputs on the handheld device.

7. A tester system for testing one or more applications, the one or more applications being processed on a handheld device, the tester system comprising:
    a processor; and
    a memory operatively coupled to the processor, the memory storing computer executable instructions which, when executed by the processor, cause the processor to carry out a method comprising:
    receiving a first error state corresponding to a first error encountered while running the one or more applications;
    making a determination whether the tester system contains one or more test script parameters for solving the first error;
    after determining that the tester system contains one or more test script parameters for solving the first error, retrieving the one or more test script parameters for solving the first error;
    providing the one or more test script parameters for solving the first error to an input subsystem, wherein the input subsystem is connected to the handheld device;
    receiving a second error state corresponding to a second error encountered while running the one or more applications;
    making a determination whether the tester system contains one or more test script parameters for solving the second error;
    after determining that the tester system does not contain one or more test script parameters for solving the second error, notifying, by the tester system, a user to provide one or more user inputs for solving the second error;
    receiving the one or more user inputs for solving the second error from the user;
    providing the one or more user inputs for solving the second error to the input subsystem;
    storing, within the tester system, the one or more user inputs for solving the second error;
    upon subsequent receipt of the second error again, retrieving, by the tester system, the one or more stored user inputs for solving the second error; and
    providing the one or more stored user inputs for solving the second error to the input subsystem, thereby avoiding notifying the user again to resolve the second error.

8. The tester system of claim 7, wherein the second error state is received through an output subsystem, wherein the output subsystem captures a screen image of the second error state from the handheld device.

9. The tester system of claim 8, wherein the output subsystem further captures the screen image from the handheld device at one or more predetermined intervals.

10. The tester system of claim 7, wherein the second error state is displayed on a display unit.

11. The tester system of claim 7, wherein the one or more user inputs from the user are stored in a database.

12. The tester system of claim 7, wherein the input subsystem processes the one or more test script parameters and the one or more user inputs on the handheld device.

13. A system for testing one or more applications, the system comprising:
    an input subsystem;

an output subsystem; and
a tester system, wherein the tester system comprises of:
   a processor; and
      a memory operatively coupled to the processor, the memory storing computer executable instructions which, when executed by the processor, cause the processor to carry out a method comprising:
      receiving an error state corresponding to the one or more applications from the output subsystem, wherein the output subsystem is configured to capture a screen image of the error state from a handheld device and transmits the screen image of the error state to the tester system;
      retrieving one or more test script parameters corresponding to the error state from a database, wherein the one or more test script parameters corresponding to the error state are stored in the database;
      providing the one or more test script parameters to the input subsystem, wherein the input subsystem comprises:
         a subsystem receiver configured to receive the one or more test script parameters and one or more user inputs from the tester system; and
         a processing module configured to process the one or more test script parameters and the one or more user inputs on the handheld device;
      notifying a user to provide one or more user inputs corresponding to the error state;
         receiving the one or more user inputs from the user; and
         providing the one or more user inputs to the input subsystem;
      wherein the processing module of the input subsystem comprises a 3-axis robot, wherein the 3-axis robot moves in a 2-D plane and performs one or more of pressing, holding and scrolling on the handheld device.

14. The system of claim 13, wherein the output subsystem comprises an imaging device for capturing the screen image of the error state from the handheld device.

15. The system of claim 14, wherein the imaging device further captures the screen image of the handheld device at one or more predetermined intervals.

16. The system of claim 13, wherein the tester system further comprises a display unit for displaying the error state.

17. The system of claim 13, wherein the database of the tester system further stores the one or more user inputs corresponding to the error state; automatically retrieves the stored user inputs; and provides the stored user inputs to the input subsystem when the error state is encountered again.

18. A non-transitory computer-readable storage medium storing instructions for performing a method, using one or more computing devices, for testing one or more applications running on a handheld device, the method comprising:
   receiving, by a tester system, a first error state corresponding to a first error encountered while running the one or more applications;
   making a determination, by the tester system, whether the tester system contains one or more test script parameters for solving the first error;
   after determining that the tester system contains one or more test script parameters for solving the first error, retrieving, by the tester system, the one or more test script parameters for solving the first error;
   providing, by the tester system, the one or more test script parameters for solving the first error to an input subsystem, wherein the input subsystem is connected to the handheld device;
   receiving, by the tester system, a second error state corresponding to a second error encountered while running the one or more applications;
   making a determination, by the tester system, whether the tester system contains one or more test script parameters for solving the second error;
   after determining that the tester system does not contain one or more test script parameters for solving the second error, notifying, by the tester system, a user to provide one or more user inputs for solving the second error;
   receiving, by the tester system, the one or more user inputs for solving the second error from the user;
   providing, by the tester system, the one or more user inputs for solving the second error to the input subsystem;
   storing, within the tester system, the one or more user inputs for solving the second error;
   upon subsequent receipt, by the tester system, of the second error again, retrieving, by the tester system, the one or more stored user inputs for solving the second error; and
   providing, by the tester system, the one or more stored user inputs for solving the second error to the input subsystem, thereby avoiding notifying the user again to resolve the second error.

19. The non-transitory computer-readable storage medium of claim 18, wherein the second error state is received by the tester system through an output subsystem, wherein the output subsystem captures a screen image of the error state from the handheld device.

20. The non-transitory computer-readable storage medium of claim 19, wherein the output subsystem further captures the screen image of the handheld device at one or more predetermined intervals.

21. The non-transitory computer-readable storage medium of claim 18, wherein the second error state is displayed on a display unit.

22. The non-transitory computer-readable storage medium of claim 18, wherein the one or more user inputs from the user are stored in a database.

23. The non-transitory computer-readable storage medium of claim 18, wherein the input subsystem processes the one or more test script parameters and the one or more user inputs on the handheld device.

* * * * *